US011610230B2

(12) United States Patent
Ruxton et al.

(10) Patent No.: US 11,610,230 B2
(45) Date of Patent: Mar. 21, 2023

(54) SYSTEM AND METHOD OF DETECTION AND RECORDING OF REALIZATION ACTIONS IN ASSOCIATION WITH CONTENT RENDERING

(71) Applicant: Google LLC, Mountain View, CA (US)

(72) Inventors: Adam Ruxton, San Francisco, CA (US); Elizabeth Ariel Van Alstine, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/706,643

(22) Filed: Dec. 6, 2019

(65) Prior Publication Data

US 2020/0118174 A1 Apr. 16, 2020

Related U.S. Application Data

(63) Continuation of application No. 16/110,086, filed on Aug. 23, 2018, now Pat. No. 10,504,155, which is a continuation of application No. 14/697,120, filed on Apr. 27, 2015, now Pat. No. 10,083,464.

(51) Int. Cl.
*G06Q 30/00* (2012.01)
*G06Q 30/0251* (2023.01)
*G06Q 30/0242* (2023.01)
*G06Q 30/0211* (2023.01)

(52) U.S. Cl.
CPC ..... *G06Q 30/0269* (2013.01); *G06Q 30/0211* (2013.01); *G06Q 30/0242* (2013.01); *G06Q 30/0267* (2013.01)

(58) Field of Classification Search
CPC .......... G06Q 30/0211; G06Q 30/0242; G06Q 30/0267; G06Q 30/0269; G06Q 30/0207–0277
See application file for complete search history.

(56) References Cited

U.S. PATENT DOCUMENTS

| 5,948,061 | A  | * | 9/1999  | Merriman ........... G06Q 30/0251 709/219 |
| 7,130,808 | B1 | * | 10/2006 | Ranka .............. G06Q 10/06315 705/7.29 |
| 7,257,546 | B2 |   | 8/2007  | Ebrahimi |
| 7,406,434 | B1 | * | 7/2008  | Chang ................ G06Q 30/0204 705/14.1 |
| 7,996,521 | B2 | * | 8/2011  | Chamberlain .......... H04L 67/53 709/224 |

(Continued)

*Primary Examiner* — Luis A Brown
(74) *Attorney, Agent, or Firm* — Dority & Manning, P.A.

(57) ABSTRACT

Systems and methods of the present disclosure allow associating rendered third-party content to respective conversions. A data processing system can provide a third-party content item for rendering on a first client computing device and store information indicative of such rendering. The data processing system can detect a realization action associated with a second client computing device and correlating the realization action with the rendering of the third-party content item based on the stored information indicative of the rendering. The data processing system can then update a realization action parameter associated with the third-party content item in response to correlating the realization action with the rendering of the third-party content item.

15 Claims, 5 Drawing Sheets

(56) References Cited

U.S. PATENT DOCUMENTS

| | | | |
|---|---|---|---|
| 8,775,243 B2 * | 7/2014 | Gillenson | G06Q 30/0216 |
| | | | 705/14.1 |
| 9,552,590 B2 * | 1/2017 | O'Reilly | G06Q 30/0246 |
| 10,083,464 B1 | 9/2018 | Ruxton | |
| 10,853,845 B2 * | 12/2020 | Herkert | G06Q 30/0221 |
| 10,902,438 B2 * | 1/2021 | Matsuo | G06Q 30/02 |
| 2002/0004733 A1 | 1/2002 | Addante | |
| 2002/0072965 A1 | 6/2002 | Merriman | |
| 2004/0054800 A1 * | 3/2004 | Shah | H04L 67/1095 |
| | | | 709/240 |
| 2005/0222987 A1 | 10/2005 | Vadon | |
| 2005/0235030 A1 | 10/2005 | Lauckhart | |
| 2005/0240557 A1 | 10/2005 | Rorex | |
| 2006/0282309 A1 * | 12/2006 | Zhang | G06Q 30/02 |
| | | | 705/14.1 |
| 2007/0038516 A1 * | 2/2007 | Apple | G06Q 30/02 |
| | | | 705/14.42 |
| 2007/0073585 A1 | 3/2007 | Apple | |
| 2007/0129999 A1 | 6/2007 | Zhou | |
| 2007/0244746 A1 | 10/2007 | Issen | |
| 2007/0294292 A1 * | 12/2007 | Hydrie | H04W 99/00 |
| 2008/0033790 A1 | 2/2008 | Nickerson | |
| 2008/0091771 A1 * | 4/2008 | Allen | G06Q 10/10 |
| | | | 709/203 |
| 2008/0201731 A1 * | 8/2008 | Howcroft | H04N 21/466 |
| | | | 348/E7.071 |
| 2008/0228568 A1 * | 9/2008 | Williams | G06Q 30/0239 |
| | | | 705/14.66 |
| 2008/0270551 A1 * | 10/2008 | Flake | G06Q 10/10 |
| | | | 709/206 |
| 2008/0320119 A1 | 12/2008 | Achan | |
| 2009/0006192 A1 | 1/2009 | Martinez | |
| 2009/0125444 A1 | 5/2009 | Cochran | |
| 2010/0042471 A1 * | 2/2010 | Chang | G06Q 30/02 |
| | | | 705/14.19 |
| 2010/0049602 A1 | 2/2010 | Softky | |
| 2010/0070351 A1 | 3/2010 | Kang | |
| 2010/0161492 A1 | 6/2010 | Harvey | |
| 2010/0268574 A1 * | 10/2010 | Butcher | G06Q 10/10 |
| | | | 709/224 |
| 2010/0268584 A1 | 10/2010 | Pullur | |
| 2010/0287035 A1 * | 11/2010 | Nemitz | G06Q 30/0255 |
| | | | 705/14.66 |
| 2011/0029376 A1 | 2/2011 | Mills | |
| 2011/0218846 A1 * | 9/2011 | Fieldman | G06Q 30/0211 |
| | | | 705/14.16 |
| 2012/0259698 A1 * | 10/2012 | Yurow | G06Q 20/326 |
| | | | 705/14.51 |
| 2013/0036040 A1 | 2/2013 | Giudilli | |
| 2013/0073372 A1 * | 3/2013 | Novick | G06Q 30/0225 |
| | | | 705/14.36 |
| 2013/0110637 A1 | 5/2013 | Bott | |
| 2013/0179250 A1 * | 7/2013 | Nguyen | G06Q 20/387 |
| | | | 705/14.38 |
| 2013/0297390 A1 * | 11/2013 | Jaquez | G06Q 20/36 |
| | | | 705/41 |
| 2014/0108531 A1 * | 4/2014 | Klau | H04N 21/4788 |
| | | | 709/204 |

* cited by examiner

SYSTEM AND METHOD OF DETECTION AND RECORDING OF REALIZATION ACTIONS IN ASSOCIATION WITH CONTENT RENDERING

CROSS REFERENCE TO RELATED APPLICATIONS

This application is a continuation of and claims priority to U.S. patent application Ser. No. 16/110,086 filed Aug. 23, 2018, and entitled "System and Method of Detection and Recording of Realization Actions in Association with Content Rendering," which is a continuation of and claims priority to U.S. patent application Ser. No. 14/697,120 filed Apr. 27, 2015, and entitled "System and Method of Detection and Recording of Realization Actions in Association with Content Rendering," now U.S. Pat. No. 10,083,464. The complete disclosure of the above-identified priority applications is hereby fully incorporated herein by reference.

BACKGROUND

In a networked environment, such as the Internet or other networks, first-party content providers can provide information for public presentation on resources, for example webpages, documents, applications, geographic maps or other resources. The first-party content can include information provided by the first-party content providers via, for example, a resource server for presentation on a client device over the Internet. The first-party content may be a webpage requested by the client device or a stand-alone application (e.g., a video game, a chat program, or navigation application) running on the client device. Additional third-party content can also be provided by third-party content providers for presentation on the client device together with the first-party content provided by the first-party content providers. Thus, a person viewing a resource can access the first-party content that is the subject of the resource as well as the third-party content that may or may not be related to the subject matter of the resource.

SUMMARY

Implementations described herein relate to providing online content of a plurality of products for display on client devices. In particular, implementations described herein relate to generating and providing for display a bundle of a plurality of products each associated with a plurality of sellers in response to a search query.

At least one aspect relates to a method for associating realization actions with displayed online content. The method includes a data processing system providing a third-party content item for rendering by a first client computing device and logging information indicative of the rendering of the third-party content item on the first client computing device. The method also includes the data processing system obtaining an indication of providing a coupon to a second client computing device and, in response, providing the coupon to the second client computing device. The method also includes the data processing system detecting a realization action based on an interaction between the second client computing device and a near field communication (NFC) terminal, and correlating the realization action with the rendering of the third-party content item based at least in part on the information indicative of the rendering of the third-party content item on the first client computing device. The method also includes updating a realization action parameter associated with the third-party content item in response to correlating the realization action with the rendering of the third-party content item.

At least one aspect relates to a data processing system for associating realizations with displayed online content. The data processing system can include a memory for storing computer code instructions and a processor. The processor is configured, upon executing the computer code instructions, to perform several operations. The operations include providing a third-party content item for rendering by a first client computing device and logging information indicative of the rendering of the third-party content item by the first client computing device. The operations include obtaining an indication of providing a coupon to a second client computing device and, in response, providing the coupon to the second client computing device. The operations also include detecting a realization action based on an interaction between the second client computing device and a NFC terminal, and correlating the realization action with the rendering the third-party content item based at least in part on the information indicative of the rendering of the third-party content item by the first client computing device. The operations also include updating a realization action parameter associated with the third-party content item in response to correlating the realization action with the rendering of the third-party content item.

At least one aspect relates to a computer readable storage device storing instructions that, when executed by one or more processors, cause the one or more processors to perform several operations for associating realizations with displayed online content. The operations include providing a third-party content item for rendering by a first client computing device and logging information indicative of the rendering of the third-party content item by the first client computing device. The operations include obtaining an indication of providing a coupon to a second client computing device and, in response. providing the coupon to the second client computing device. The operations also include detecting a realization action based on an interaction between the second client computing device and a NFC terminal, and correlating the realization action with the rendering the third-party content item based at least in part on the information indicative of the rendering of the third-party content item by the first client computing device. The operations also include updating a realization action parameter associated with the third-party content item in response to correlating the realization action with the rendering of the third-party content item.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
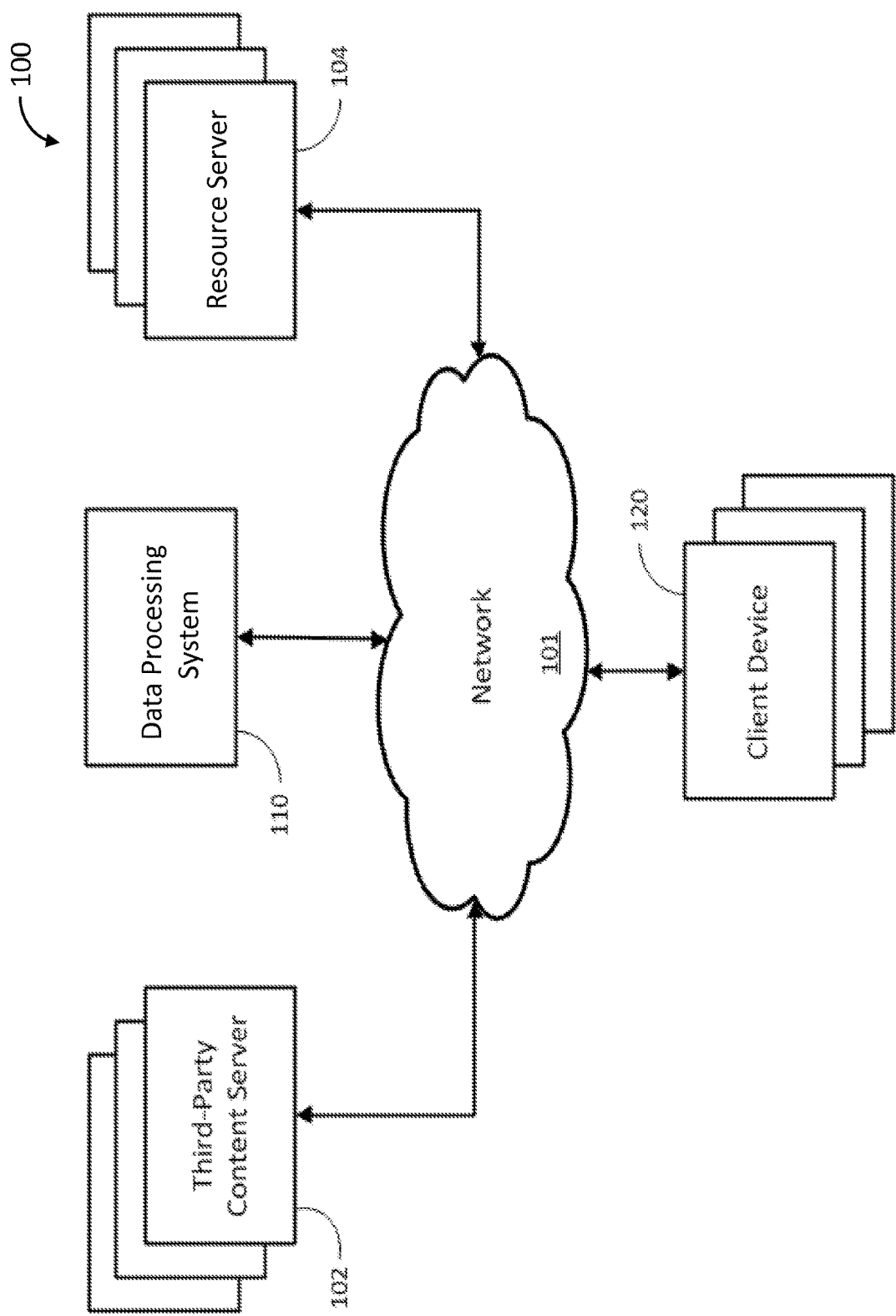
FIG. 1 is an overview depicting an implementation of a system of providing information via a computer network.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

A computing device (e.g., a client device) can access a resource for display, such as a webpage, a document, an application or a geographic map, for example. The computing device can access the resource via the Internet by communicating with a server, such as a webpage server, corresponding to that resource. The resource can include first-party content that is the subject of the resource from a first-party content provider and may also include additional third-party provided content, such as advertisements or other content. A webpage server or a client device can communicate with a data processing system, such as a content item selection system, to request a content item to be presented with a requested webpage, such as through the execution of code of the resource to request a third-party content item to be presented with the resource. The data processing system can select a third-party content item and provide data to effect presentation of the content item with the requested webpage on a display of the client device. In some instances, the content item is selected and served with a resource associated with a search query response. For example, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. Responsive to use of the application, a resource server or a client device can communicate with a data processing system, such as a content item selection system, to request a content item to be presented with a user interface of the application or otherwise. The data processing system can select a third-party content item and provide data to effect presentation of the content item with the application on a display of the client device.

A device identifier may be associated with the client device. The device identifier may be a randomized or pseudo-randomized number associated with the client device to identify the device during subsequent requests for resources or content items. The device identifier can store or cause the client device to transmit information related to the client device to the data processing system or resource server (e.g., values of sensor data, a web browser type, an operating system, historical resource requests, historical content item requests, etc.).

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the data processing system in an auction to select and serve content items for presentation with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other examples, a third-party content provider may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the data processing system uses content item interaction data to determine the performance of the third-party content provider's content items. For example, users may be more inclined to click on third-party content items on certain webpages over others. Accordingly, auction bids to place the third-party content items may be higher for high-performing webpages, categories of webpages, or other criteria, while the bids may be lower for low-performing webpages, categories of webpages, or other criteria.

In some instances, one or more performance metrics for the third-party content items may be determined and indications of such performance metrics may be provided to the third-party content provider via a user interface for the content item management account. For example, the performance metrics may include a cost per impression (CPI) or cost per thousand impressions (CPM), where an impression may be counted, for example, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), or other performance metrics may be used.

In some instances, a webpage or other resource (such as, for example, an application) includes one or more content item slots in which a selected and served third-party content item may be displayed. The code (e.g., JavaScript®, HTML, etc.) defining a content item slot for a webpage or other resource may include instructions to request a third-party content item from the data processing system to be presented with the webpage. In some implementations, the code may include an image request having a content item request URL that may include one or more parameters (e.g., /page/contentitem?devid=abc123&devnfo=A34r0). Such parameters may, in some implementations, be encoded strings such as "devid=abc123" or "devnfo=A34r0."

The selection of a third-party content item to be served with the resource by a data processing system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the data processing system through an auction.

During an auction for a content item slot for a resource, such as a webpage, several different types of bid values may be utilized by third-party content providers for various third-party content items. For example, an auction may include bids based on whether a user clicks on the third-party content item, whether a user performs a specific action based on the presentation of the third-party content item, whether the third-party content item is selected and served, or other types of bids. For example, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid or adjusted for other reasons. For example, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or a normalized value, may be generated to be used in the auction based on the bid value and the probability or another modifying value. In the prior example, the value or score for a bid based on whether the third-party content item is selected and served may be $0.005*1.00=0.005 and the value or score for a bid based on whether a user performs a specific action may be $5*0.002=0.01. To maximize the income generated, the data processing system may select the third-party content item with the highest value from the auction. In the foregoing example, the data processing system may select the content item associated with the bid based on whether the user performs the specific action due to the higher value or score associated with that bid.

Once a third-party content item is selected by the data processing system, data to effect presentation of the third-party content item on a display of the client device may be provided to the client device using a network. In the present disclosure, the term "product item" is used interchangeably to refer to a physical product item or electronic content (such as text, image, video or a combination thereof) associated with (or indicative of) a corresponding physical product item.

A common issue faced by many online content delivery systems is how to couple or associate displayed third-party content with resulting realization actions (also referred to as conversions or conversion actions). When an online content delivery system provides a third-party content item for display on a client device, the challenge is how to accurately measure the effectiveness of the presented third-party content item in engaging a respective user to take further actions beyond viewing the third-party content item. For instance, how can the online content delivery system determine whether the user visited a store, purchased a product or service or visited a website or domain associated with the third-party content item after viewing the third party content item. Detecting and identifying such actions in connection with previously presented third-party content item(s) allows third-party content providers to evaluate the effectiveness of their rendered content.

Systems and methods of the present disclosure allow automatic detection and identification of a realization action in connection with displayed online content. Upon providing a third-party content item for display by a first client computing device, an online content delivery system can store information indicative of the rendering of the third-party content item by the first client computing device. The information can include identification of the third-party content item (or a brand or entity associated thereof), the number of times the third-party content item has been rendered by the first client computing device, a time value (which can include date and time of rendering the third-party content item on the first client computing client device), identification of the first client computing device, or a combination thereof. The online content delivery system can store the information in association with an online campaign associated with third-party content item or an online account associated with the first client computing device (or with the respective user). The online account can include a mobile payment account such as a mobile wallet account, a cloud account, an email account, a social media account or a combination thereof. The online account can include indications of client computing devices associated with the respective user. The online campaign can include an advertisement campaign.

Using the information indicative of presentation of the third-party content item, the online content delivery system can detect a realization action associated with the third-party content item rendered by the first client computing device and involving a second client computing device. The second client computing device can be different from the first client computing device that rendered the third-party content item. The realization action can include a transaction to purchase a product item or service associated with the third-party content item, a visit to a store associated with the third-party content item, or visit to an online domain (such as a website, online game platform, online service platform or online application) associated with the third-party content item.

Detection of the realization action can include an electronic device (such as a local area network device, a point of sale device or a near-field communication (NFC) terminal) in a store associated with the third party content item detecting presence of the second client computing device in the store and providing an indication of such presence to the online content delivery system. In some implementations, the online content delivery system can detect the realization action by receiving an indication (for instance, from a network server, merchant computer device or NFC terminal) of a transaction involving the second client computing device. The indication can include an identification of a purchased item or service (or a type thereof), an identification of a seller (or brand), an identification of a redeemed coupon, an identification of the second client computing device or a combination thereof. In some implementations, the online content delivery system can receive an indication (for instance, from a web server) of an access of web site or web domain by the second client computing device. The indication can include identification of the web site (or online domain) or an owner thereof, access type identification, a navigation level, identification of the second client computing device or a combination thereof.

The online content delivery system can compare information in the received indication (such as identification of the second client computing device, identification of a store or owner thereof, identification of web site or owner thereof, identification of purchased item or service, identification of a redeemed coupon or a combination thereof) with stored information indicative of previously presented third-party content item(s). For instance, the online content delivery system can determine whether the second client computing device is associated with the first client computing device (or a user thereof) and whether information identifying the realization action is associated with any of the third-party content items, if any, previously presented for display by the first client computing device.

Upon identifying a third-party content item previously presented on the first client computing device (or to a user thereof) that is associated with the detected realization action, the online content delivery system can update a realization action parameter associated with the identified third-party content item. The realization action parameter can include a realization rate parameter.

As described above, the process of detecting and identifying realization actions in connection with displayed third-party content allows for measuring return on investment for third-party content providers without input from client computing devices (or users thereof) and without negatively affecting user experience.

While the foregoing has provided an overview of associating displayed third-party content with realization actions, processes and computer systems described in the current disclosure provide illustrative implementations of detecting realization actions and coupling such actions to corresponding previously displayed third-party content items. The processes and computer systems described herein provide a variety of approaches for reliably detecting a realization action and connecting the detected realization action to a previously rendered third-party content item even if the realization action and the third-party content item occur through different client computing devices. The processes and computer systems described in this disclosure can allow automatic evaluation of return on investment for third-party content providers. Such evaluation can help improve third-party content provided for display on client computing devices and, therefore, help improve online user experience.

FIG. 1 is a block diagram of an implementation of a system 100 for providing information via at least one computer network such as the network 101. The network 101 may include a local area network (LAN). wide area network (WAN), a telephone network, such as the Public Switched Telephone Network (PSTN), a wireless link, an intranet, the Internet, or combinations thereof. The system 100 can also include at least one data processing system, such as a content item selection system 110. The data processing system 110 can include at least one logic device, such as a computing device having a data processor, to communicate via the network 101, for example with a resource server 104, a client device 120, or a third-party content server 102. The data processing system 110 can include one or more data processors, such as a content placement processor, configured to execute instructions stored in a memory device to perform one or more operations described herein. In other words, the one or more data processors and the memory device of the data processing system 110 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C #, Java®, JavaScript®, Perl®, HTML, XML, Python®, and Visual Basic®. The processor may process instructions and output data to effect presentation of one or more content items to the resource server 104 or the client device 120. In addition to the processing circuit, the data processing system 110 may include one or more databases configured to store data. The content item selection system 110 may also include an interface configured to receive data via the network 101 and to provide data from the data processing system 110 to any of the other devices on the network 101. The data processing system 110 can include a server, such as an advertisement server or otherwise.

The client device 120 can include one or more devices such as a computer, laptop, desktop, smart phone, tablet, personal digital assistant, set-top box for a television set, a smart television, or server device configured to communicate with other devices via the network 101. The device may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C #, HTML, Java®, JavaScript®, Perl®, Python®, Visual Basic®, and XML.

The client device 120 can execute a software application (e.g., a web browser or other application) to retrieve content from other computing devices over the network 101. Such an application may be configured to retrieve first-party content from a resource server 104. An application running on the client device 120 may itself be first-party content (e.g., a game, a media player, etc.). The client device 120 can execute a web browser application that provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device 120 executing the instructions from the web browser application may request data from another device connected to the network 101 referred to by the URL address (e.g., a resource server 104). The other device may then provide web page data, geographic map data, or other data to the client device 120, which causes visual indicia to be displayed by the display of the client device 120. Accordingly, the browser window displays the retrieved first-party content, such as web pages from various websites, to facilitate user interaction with the first-party content.

The resource server 104 can include a computing device, such as a server, configured to host a resource, such as a web page or other resource (e.g., articles, comment threads, music, video, graphics, search results, information feeds, geographic map data, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 120 can access the resource server 104 via the network 101 to request data to effect presentation of a resource of the resource server 104.

One or more third-party content providers may have third-party content servers 102 to directly or indirectly provide data for third-party content items to the data processing system 110 or to other computing devices via network 101. The content items may be in any format that may be presented on a display of a client device 120, for example, graphical, text, image, audio, video, etc. The content items may also be a combination (hybrid) of the formats. The content items may be banner content items, interstitial content items, pop-up content items, rich media content items, hybrid content items, Flash (content items, cross-domain iframe content items, etc. The content items may also include embedded information such as hyperlinks, metadata, links, machine-executable instructions, annotations, etc. In some instances, the third-party content servers 102 may be integrated into the data processing system 110 or the data for the third-party content items may be stored in a database of the data processing system 110.

In one implementation, the data processing system 110 can receive, via the network 101, a request for a content item to present with a resource. The request may be received from a resource server 104, a client device 120, or any other computing device. The resource server 104 may be owned or ran by a first-party content provider that may include instructions for the data processing system 110 to provide third-party content items with one or more resources of the first-party content provider on the resource server 104. In one implementation, the resource may include a web page, or geographic map data. The client device 120 may be a computing device operated by a user (represented by an anonymous device identifier), which, when accessing a resource of the resource server 104, can make a request to the data processing system 110 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the data processing system 110 receives can include a HyperText Transfer Protocol (HTTP) cookie that contains a device identifier (e.g., a random or pseudo random number) that represents the client device 120. The device information or the resource information may be appended to a content item request URL (e.g., contentitem.item/page/contentitem?devid=abc123&devnfob=A34r0). The device information or the resource information may be encoded prior to being appended the content item request URL. The requesting device information or the resource information may be utilized by the data processing system 110 to select third-party content items to be served with the requested resource and presented on a display of a client device 120.

A resource of a resource server 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client device 120. The search results may include web page titles, hyperlinks, etc. One or more third-party content items may also be presented with the search results in a content item slot of the search result web page. Accordingly, the resource server 104 or the client device 120 may request one or more content items from the data processing system 110 to be presented in the content item slot of the search result web page. The content item request may include additional information, such as the user device information, the resource information, a quantity of content items, a format for the content items, the search query string, keywords of the search query string, information related to the query (e.g., geographic location information or temporal information), etc. In some implementations, the resource server(s) 104 (or the data processing system 110) can make a delineation between the search results and the third-party content items to avert confusion.

The third-party content server(s) 102 can manage the selection and serving of content items by the data processing system 110. For example, the third-party content server(s) 102 may set bid values or selection criteria via a user interface that may include one or more content item conditions or constraints regarding the serving of content items. A third-party content server 102 can specify that a content item or a set of content items are to be selected and served for user devices 120 having device identifiers associated with a certain geographic location or region, a certain language, a certain operating system, a certain web browser, etc. In another implementation, the third-party content provider can specify that a content item or set of content items are to be selected and served when the resource, such as a web page, document, etc., contains content that matches or is related to certain keywords, phrases, etc. The third-party content server 102 can set a single bid value for several content items, set bid values for subsets of content items, or set bid values for each content item. The third-party content provider may also set the types of bid values, such as bids based on whether a user clicks on the third-party content item, whether a user performs a specific action based on the presentation of the third-party content item, whether the third-party content item is selected and served, or other types of bids.

Figure 2:
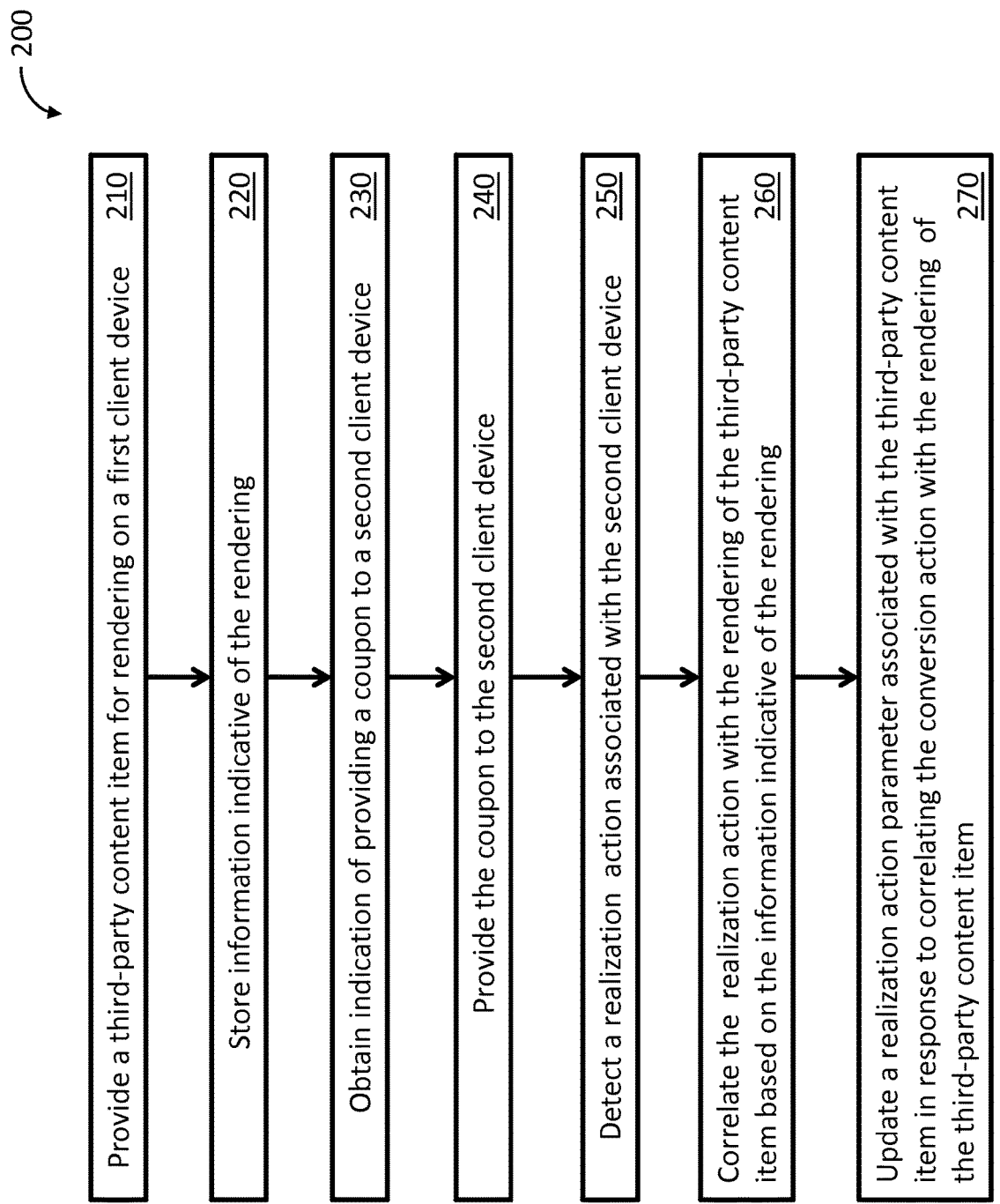
FIG. 2 shows a flowchart illustrating a method of associating realization actions with displayed online content.

FIG. 2 shows a flowchart illustrating a method 200 of associating realization actions with displayed online content. The method 200 includes providing a third-party content item for rendering by a first client computing device (ACT 210), storing information indicative of the rendering of the third-party content item by the first client computing device (ACT 220), obtaining an indication of providing a coupon to a second client computing device (ACT 230), providing the coupon to the second client computing device (ACT 240), detecting a realization action associated with the second client computing device (ACT 250) correlating the realization action with the rendering of the third-party content item by the first client computing device based at least in part on the information indicative of the rendering of the third-party content item (ACT 260) and updating a realization action parameter associated with the third-party content item in response to correlating the realization action with the rendering of the third-party content item (ACT 270).

Figure 3:
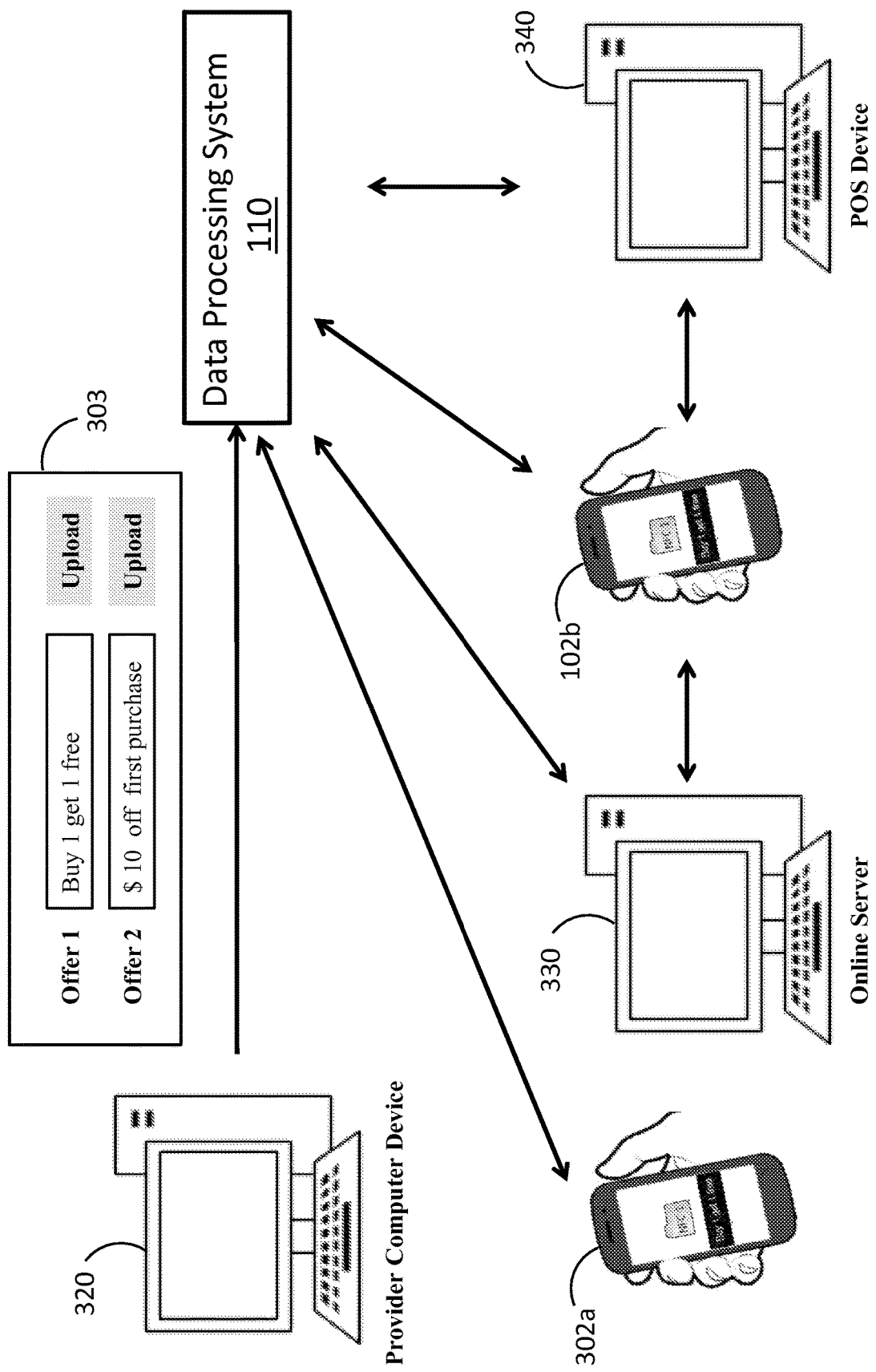
FIG. 3 is an overview depicting an implementation of communications based on which a data processing system can detect a realization.

FIG. 3 is an overview depicting an implementation of communications between separate entities involved in associating rendered online content with realization actions. The data processing system 110 can be communicatively coupled to a provider computer device 320 associated with a third-party content provider, an online server 330. a first client computing device 302a, a second client computing device 302b, a POS device 340 or a combination thereof. The POS device 340 can include a computer device, a near field communication (NFC) terminal, or a combination thereof. The data processing system 110 can be configured to detect a realization action based on communication(s) with the provider computer device 320, the online server 330, the first client computing device 302a. the second client computing device 302b, the POS device or a combination thereof. The first (or second) client computing device 302a (or 302b) can include a desktop, laptop, smart phone, tablet or smart watch (or smart wearable).

Referring to FIGS. 2 and 3, The method 200 includes a data processing system 110 providing a third-party content item for rendering by a first client computing device 302a (ACT 210). In some implementations, the data processing system 110 (or a processor thereof) can receive a query for third-party content from the resource server 104 (shown in FIG. 1), a first client computing device 302a, or a search engine via the network 101 (shown in FIG. 1). In some implementations, the data processing system 110 can receive an indication of a rendering of a resource or search results on the first client computing device 302a. In response to the query or the indication of resource rendering, the data processing system 110 can select and provide a third-party content item for display by the first client computing device 302a with the resource or search results. In some implementations, the query or the indication of resource rendering can include an identification of the first client computing device 302a, an identification of the resource (such as a website address), an indication of a context (or keywords) associated with a search query, information about the resource (such as number of slots for displaying third-party content or resource content type) or a combination thereof. The data processing system 110 can select and provide a number of third-party content items (for instance, equal to the number of slots associated with the resource) for display by the first client computing device 302a.

Upon providing the third-party content item for display by the first client computing device 302a. the data processing system 110 (or a processor thereof) can store information indicative of the rendering of the third-party content item by the first client computing device 302a (ACT 220). The information can include an identification of the third-party content item provided for display to the first client computing device, information associated with the respective third-party content provider or a brand thereof, an identification of the first client computing device 302a (or a user thereof), a number of times the third-party content item has been rendered by the first client computing device (or to the user thereof), date and time of providing the third-party content item for rendering or a combination thereof.

In some implementations, the data processing system 110 (or a processor thereof) can log the information indicative of the rendering of the third-party content item in a database associated with the respective third-party content provider (such as an advertising campaign database). For instance, if the third-party content item is an advertisement, the data processing system 110 can log the information indicative of the rendering of the advertisement in a database associated with a respective advertisement campaign. In some implementations, the data processing system 110 can log the information indicative of the rendering in a database associated with an online service account (such as a cloud account, an electronic payment account, a social network account, an email account or a combination thereof). The online service account can be associated with the first client computing device 302a or a user thereof. The data processing system 110 can store the information indicative of the rendering in a data structure, such as a lookup table (LUT). The data processing system 110 can maintain one or more LUT(s) (or other data structures) to store information mapping rendered third-party content with respective rendering client devices 302a.

The method 200 includes the data processing system 110 obtaining an indication of providing a coupon to a second client computing device 302b (ACT 23) and, in response to such indication, providing the coupon to the second client computing device 302b (ACT 240). The indication can trigger the data processing system to provide the coupon (or a respective coupon file) to the second client computing device 302b. The first and second computing devices 302a and 302b can be associated with a common online account (or a common user). In some implementations, upon providing the third-party content item (ACT 210), the data processing system 110 can receive a request from the first client computing device 302a to provide a coupon associated with the rendered third-party content item to the second client computing device 302b. For instance, the third-party content item, when rendered, can include an icon, tab or link associated with the coupon file. The tab, icon or link can allow downloading the coupon file to the first client computing device 302a or triggering the request to provide the coupon file to a second client computing device 302b. The first client computing device 302a can trigger the request to the data processing system 110 by interacting with the icon or link. The request can include an identification of the first client computing device 302a, an identification of the second client computing device 302b, an identification of the coupon (or an identification of a respective coupon file). In some implementations, upon providing the third-party content item for display by the first client computing device 302a, the data processing system 110 can identify client devices associated with the first client computing device 302a and provide copies of a coupon file to each of the identified client devices. For instance, the data processing system 110 can identify an online account (such as an electronic payment account, email account, social media account, cloud account or a combination thereof) associated with the first client computing device 302a. The data processing system 110 can then determine (for instance, based on information associated with the online account) that the second client computing device 302b is associated with the identified online account and provide the coupon (or the coupon file) to the second client computing device 302b.

In response to the obtained indication (ACT 230), the data processing system 110 can provide the coupon file to the second client computing device 302b (ACT 240). The data processing system 110 can send the coupon file (or a link thereof for downloading the coupon file) to the second client computing device 302b. The coupon file can include a near file communication (NFC) file. The second client computing device 302b can store the received coupon file for redeeming, for instance, in association with a transaction for purchasing a product item or service associated with the third-party content item rendered on the first client computing device 302a. For instance, the product item or service can be depicted in the third-party content item rendered on the first client computing device 302a or associated with a brand depicted in the third-party content item. In some implementations, the first client computing device 302a can download the coupon file.

The data processing system 110 can obtain content 303 representative of coupons from the provider computer device 320. For instance, a third-party content provider can upload (or generate) the content representative of the coupons to the data processing system 110 using the provider computer device 320. The uploaded (or generated) content can include NFC coupon files (or generally coupon files) such that each coupon file represents a respective coupon. The coupon files can be stored in a database associated with a campaign (such as an advertising campaign) of the third-party content provider.

In some implementations, the data processing system 110 can further store information indicative of the coupon provided to the second client computing device 302a in association with information indicative of the rendering of the third-party content item by the first client computing device 302a. The information indicative of the rendering of the third-party content item together with the information indicative of the coupon provided to the second client computing device 302b can be configured to couple the rendering of the third-party content item by the first client computing device 302a to the coupon, the second client computing device 302b or a combination thereof. For instance, the data processing system 110 can update the information indicative of the rendering of the third party content item to further include an indication (or identification) of the coupon, identification of the second client computing device 302b or a combination thereof. The stored information can be configured to map identifications of the second client computing device 302b and the coupon file (or the coupon) to the identifications of the first client computing device and the rendered third-party content item.

The method 200 includes the data processing system (or a processor coupled thereto) detecting a realization action associated with the second client computing device 302b (ACT 250). The realization action can include an online or in-store transaction for purchasing a product item or a service associated with the rendered third-party content item or a visit to a store associated with the rendered third-party content item, navigating to a given depth of a website associated with the rendered third-party content item, downloading or accessing online content associated with the rendered third-party content item or a combination thereof. In some implementations, the data processing system 110 can detect the realization action based on communications with the second client computing device 302b, the point-of-sale (POS) computer device 340, the online server 330, or a combination thereof. For instance, the data processing system can obtain an indication of a transaction associated with the second client computing device 302b from the online server 330 or the POS computer device 340. The transaction can include purchasing a product item or a service associated with the third-party content item rendered on the first client computing device 302a. The transaction can be an in-store transaction or an online transaction.

In some implementations, the data processing system 110 can detect redemption of the coupon by the second client computing device 302b based on an indication received from an NFC terminal (or a POS computer device 340 coupled thereto) or the provider computer device 320. For instance, the second client computing device 302b can interact with a NFC terminal to redeem the coupon. The second client computing device 302b can interact with the NFC terminal upon making (or as part of) a transaction for purchasing a product item or service associated with the third-party content item rendered by the first client computing device 302a. The NFC terminal can provide an indication of the redemption of the coupon to the POS device 340, the provider computer device 320 or the data processing system 110. The indication of the coupon redemption can include an identification of the coupon, identification of the second client computing device, identification of the NFC terminal (or a POS associated therewith), a date and time associated with the coupon redemption, indication of the transaction (such purchased product item(s) or amount of money) or a combination thereof. The data processing system 110 can obtain the indication of the coupon redemption directly from the NFC terminal or through another device.

The data processing system 110 can be configured to recognize occurrence of the transaction (or generally a realization action) associated with the second client computing device 302b in response to receiving the indication of the coupon redemption. For instance, the data processing system 110 can compare information associated with the received coupon redemption indication (such as an identification of the second client computing device 302b or identification of coupon) with previously stored information (such as the information indicative of the rendering of the third-party content item by the first client computing device 302a and the information indicative of providing the coupon to the second client computing device 302b). Based on such comparison, the data processing system 110 can determine a correlation between the third-party content item rendered by the first client computing device 302a and the coupon redemption by the second client computing device 302b.

In some implementations, the data processing system 110 can detect the realization action (ACT 250) based on the obtained indication of providing the coupon (ACT 230). The data processing system 110 can receive a request from the second client computing device 302b or another device (such as the POS device 340, the NFC terminal or the provider computer device) for a coupon associated with the third-party content item (rendered by the first client computing device 302a) to be provided to the second client computing device 302b. The request for providing the coupon can be responsive to a transaction, visit to a store, downloading online content, navigating a website or accessing an online domain by the second client computing device 302b. Accordingly, the data processing system 110 can be configured to recognize the receipt of the request for the coupon associated with the third-party content item as indicative of a transaction, visit to a store, online content download, website navigation, or online domain access. The request can include identification of the coupon and identification of the second client computing device 302b.

The method 200 includes the data processing system 110 correlating the realization action associated with the second client computing device 102 with the rendering of the third-party content item on the first client computing device based on the information indicative of the rendering of the third-party content item (ACT 260). The data processing system 110 can obtain information associated with a respective message or indication (such as a request for accessing information associated with an online account, request for a coupon, indication of a transaction, indication of a store visit, indication of accessing online content, indication of a coupon redemption or a combination thereof). The information associated with the indication or message can include an identification of the second client computing device 302b. an identification of a purchased product item or service, an identification of a store or an owner thereof, an identification of a brand, an identification of a coupon (or a respective online campaign) or a combination thereof.

The data processing system 110 can then correlate the detected realization action with the rendering of the third-party content item by the first client computing device 302 based on the information associated with the indication or message, the stored information indicative of the rendering of the third-party content item by the first client computing device 302a. the stored information indicative of providing the coupon to the second client computing device 302b or a combination thereof. For instance, based on information associated with an indication of a coupon redemption and previously stored information, the data processing system 110 can determine that the redeemed coupon was previously provided to the second client computing device 302b and that the same coupon and the second client computing device 302b are associated with the rendering of the third-party content item by the first client computing device 302a.

In instances where the data processing system 110 detected the realization action based a request for providing the coupon to the second client computing device 302b, the data processing system 110 can determine an association between the first and second client computing devices 302a and 302b based on the identification of the second client computing device 302b, an online account associated with both client computing devices or a combination thereof. For instance, the data processing system can use the identification of the second client computing device 302b to identify a corresponding online account and then determine (for instance, based on information associated with the online account) an association between the online account and the first client computing device 302a. The data processing system 110 can then identify third-party content (such as an advertising campaign or a brand) associated with the coupon (for instance, based on the identification of the coupon). Based on the identified third-party content, the data processing system 110 can identify respective third-party content items previously rendered by the first and second client computing devices 302a and 302b. Accordingly, the data processing system can correlate the detected realization action with the rendering of the third-party content item by the first client computing device.

The method 200 also includes the data processing system 110 updating a realization action parameter associated with the third-party content item in response to correlating the realization action with the rendering of the third-party content item (ACT 270). In some implementations, the realization action parameter can be a conversion rate parameter indicative of a ratio of a number of realization actions to a number of impressions of the third-party content item rendered on the first client computing device 302a. The realization parameter can include a parameter indicative of a total number of detected realization actions associated with the third-party content item rendered on the first client computing device 302a or a total of money spent associated with detected transactions. The realization parameter can be indicative of detected realization actions associated with the third-party content item rendered on the first client computing device 302a or a campaign thereof. The data processing system 110 can increment (or increase) the realization action parameter to account for the detected realization action. In some implementations, the data processing system 110 can provide a third-party content provider (associated with the rendered third-party content item) access to the realization action parameter. Accordingly, the third-party content provider is allowed to assess and evaluate (for instance, in real time) the efficiency or performance of the third-party content item.

Figure 4:
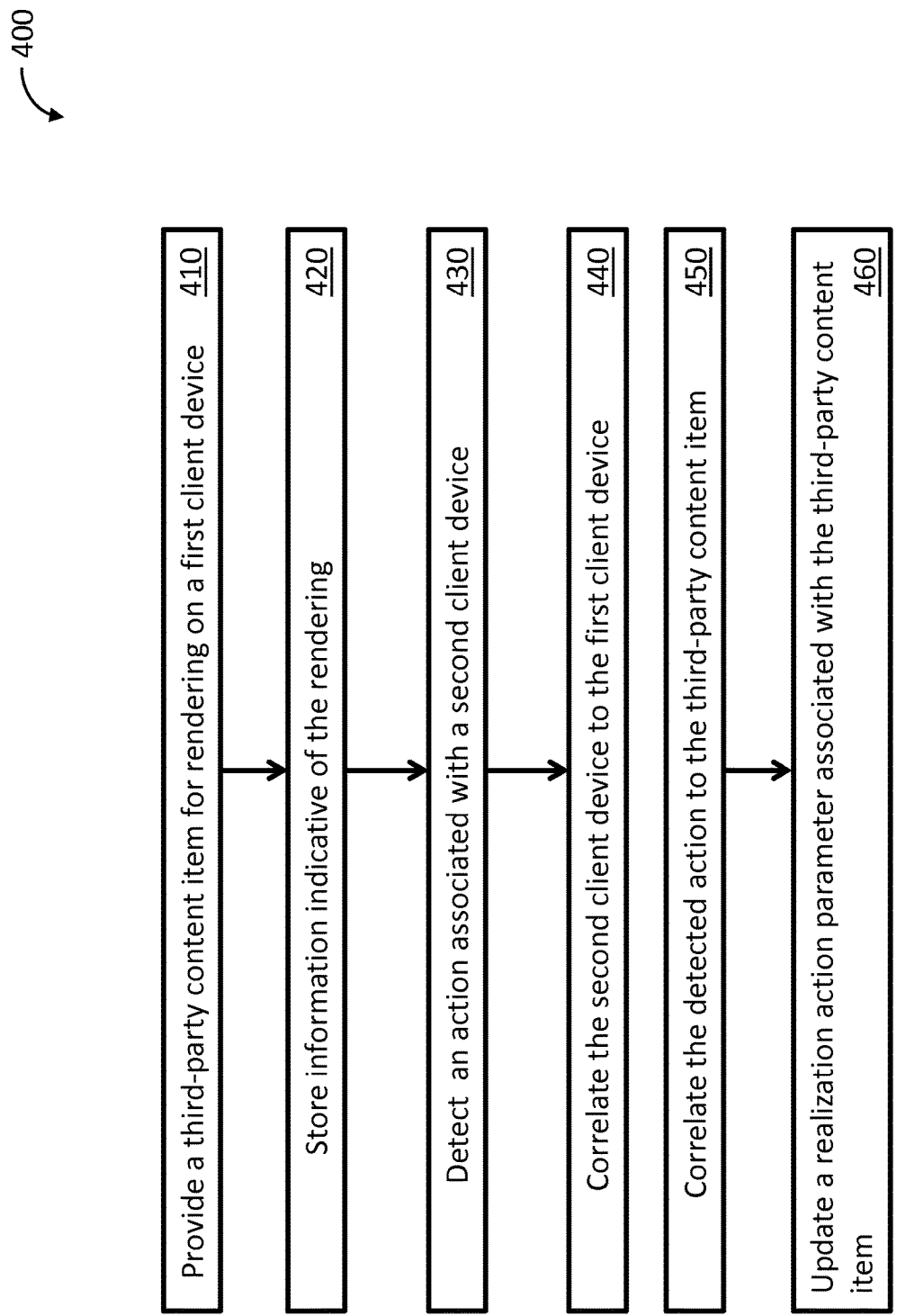
FIG. 4 shows a flowchart illustrating another method of associating realization actions with displayed online content.

FIG. 4 shows a flowchart illustrating another method 400 of associating a realization action with rendered online account. The method 445 includes providing a third-party content item for display on a first client computing device (ACT 410). storing information indicative of the rendering of the third-party content item by the first client computing device (ACT 420), detecting an action associated with a second client computing device (ACT 430), correlating the second client computing device with the first client computing device (ACT 440), correlating the detected action with the third-party content item rendered by the first client computing device (ACT 450) and updating realization action parameter associated with the third-party content item (ACT 460).

Referring to FIGS. 3 and 4, the process of providing a third-party content item for display by the first client computing device 302a (ACT 410) and the process of storing the indication of such rendering are similar to the processes described with regard to ACT 210 and ACT 220 of FIG. 2.

The method 400 includes the data processing system 110 detecting an action associated with the second client computing device 302b (ACT 430). The data processing system 110 can detect a transaction associated with the second client computing device 302b based on a request for access to information associated with an online account (such as electronic payment information). The data processing system 110 can receive the request from the second client computing device 302b or another computer device (such as the POS device 340 or the online server 330). In some implementations, the data processing system 110 can receive an indication of at least one of a store visit, online domain access, online content download, website navigation and electronic payment associated with the second client computing device 302b. For instance, a NFC terminal or wireless communication device associated with a store can detect presence of the second client computing device 302b in the store and provide an indication of such presence to the data processing system 110. Also, the online server 330 or the provider computer device 320 can detect an online transaction, content download, access of an online domain or website navigation by the second client computing device 302b and provide an indication of such action to the data processing system. The indication can include identification of the second client computing device, identification (or description) of the action, identification a store, time and data of the action or a combination thereof.

The method 400 includes the data processing system 110 correlating the second client computing device 302b with the first client computing device 302a (ACT 440). For instance, based on an identification of the second client computing device 302b, the data processing system 110 can identify an online account associated with the second client computing device 302b. The data processing system 110 can then identify an association between the online account and the first client computing device 302a based on information associated with the online account. In some implementations, the data processing system 110 can determine an association between the first and second client computing devices 302a and 302b based on previous online activities associated with each of the devices. For instance, the data processing system 110 can determine that the first and second client computing devices 302a and 302b are associated with a common user based on the similarity between the content previously rendered on each device. The data processing system can then identify third-party content previously presented to the first and second client computing devices 302a and 302b based on previously stored information (such as the information indicative of the rendering of the third-party content item by the first client computing device 302a) and identifications of the client computing devices.

The method 400 includes the data processing system 110 correlating the detected action with the third-party content item rendered by the first client computing device 302a (ACT 450). The data processing system 110 can compare information identifying (or describing) the detected action data with stored information identifying third-party content previously presented to the first and second client computing devices 302a and 302b. For instance, data processing system 110 can determine that the detected action is associated with a product item, a store, an online domain or web content that is also associated with the third-party content item (rendered by the first client computing device 302a). Upon correlating the second client computing device 302b with the first client computing device 302a (ACT 440) and correlating the detected action with the third-party content item rendered by the first client computing device 302a, the data processing system 110 can update a realization action parameter associated with the third-party content item rendered by the first client computing device 302a (ACT 460). The process of updating the realization action parameter is similar to that described with respect to ACT 270 of FIG. 2.

In some implementations, the data processing system 110 can associate realization actions with rendered content based on a combination of processes (or ACTs) associated with FIG. 2 and processes (or ACTs) associated with FIG. 4. For instance, the data processing system 110 can use redemption (or providing) of coupons together with other information (as described in FIG. 4) to detect realization actions and record such actions in association with respective rendered content.

Figure 5:
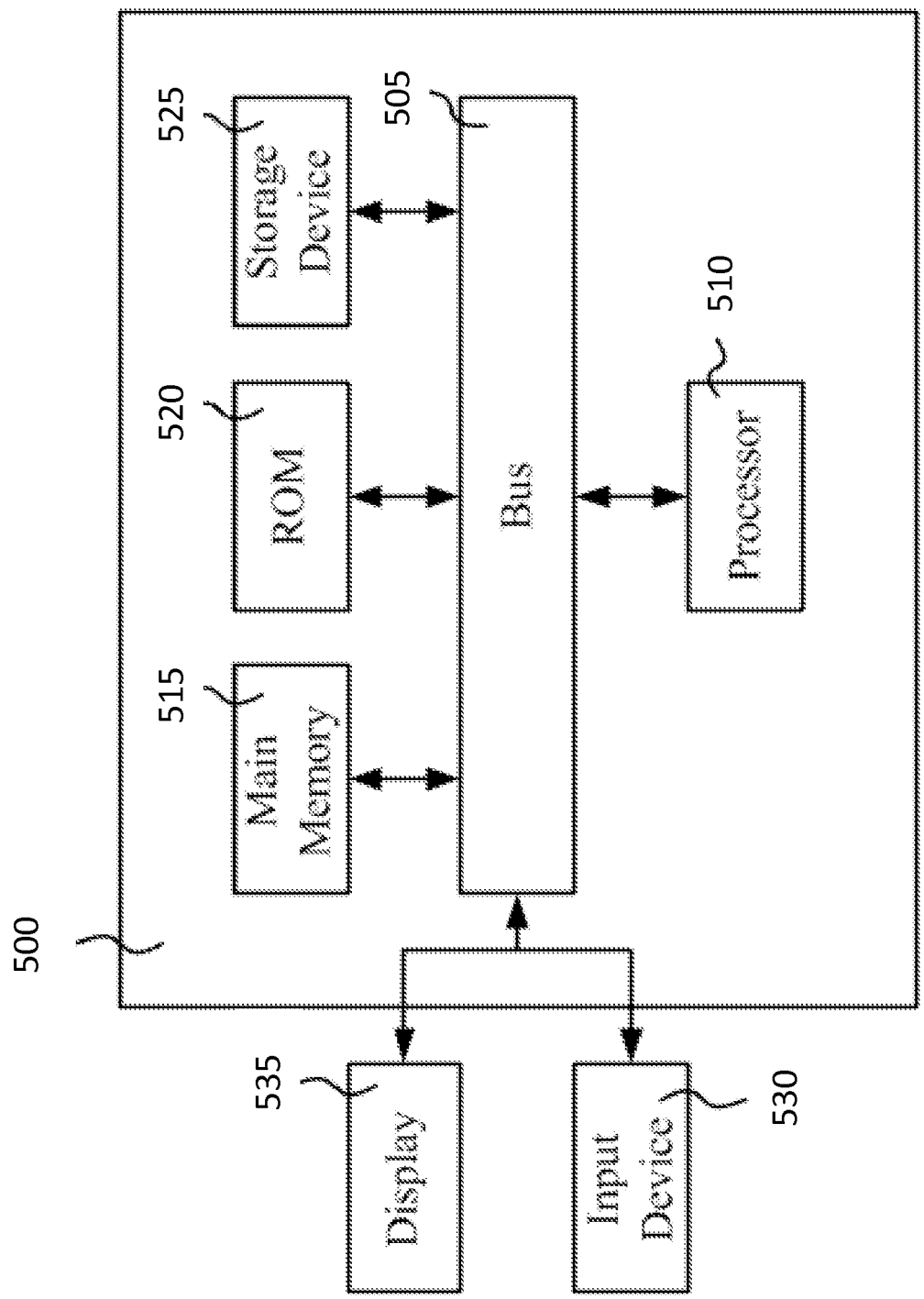
FIG. 5 is a block diagram depicting one implementation of a general architecture for a computer system that may be employed to implement various elements of the systems and methods described and illustrated herein.

FIG. 5 is a block diagram of a computer system 500 that can be used to implement the client device 120, data processing system 110, third-party content server 102, resource server 104. and other components described herein. The computing system 500 includes a bus 505 or other communication component for communicating information and a processor 510 coupled to the bus 505 for processing information. The computing system 500 can also include one or more processors 510 coupled to the bus for processing information. The computing system 500 also includes main memory 515, such as a RAM or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a ROM 520 or other static storage device coupled to the bus 505 for storing static information and instructions for the processor 510. A storage device 525, such as a solid state device, magnetic disk or optical disk, is coupled to the bus 505 for persistently storing information and instructions. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 500 may be coupled via the bus 505 to a display 535, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 530, such as a keyboard including alphanumeric and other keys, may be coupled to the bus 505 for communicating information and command selections to the processor 510. In another implementation, the input device 530 may be integrated with the display 535, such as in a touch screen display. The input device 530 can include a cursor control, such as a mouse, a trackball, or cursor direction keys, for communicating direction information and command selections to the processor 510 and for controlling cursor movement on the display 535.

According to various implementations, the processes or methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes or method ACTs described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an implementation of a computing system 500 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed. to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A computer-implemented method to associate realization actions with displayed content, comprising:
    by a data processing computing system:
        generating a first data record indicative of a rendering of a content item by a first user computing device associated with a user, wherein the first data record comprises a content item identifier and a first user computing device identifier, the first data record being stored at the data processing computing system;
        receiving from the first user computing device, instructions to provide the content item to a second user computing device;
        in response to receiving the instructions:
            transmitting the content item to the second user computing device from the data processing computing system; and
            generating a second data record indicative of transmission of the content item to a second user computing device associated with the user, wherein the second data record comprises a second user computing device identifier and the first data record, the second data record being stored at the data processing computing system;
        receiving, from a merchant computing device, transaction data comprising information identifying the content item and information identifying the second user computing device; and
        in response to determining a correlation between the received transaction data, the first data record, the second data record, and a user account, updating a realization action parameter associated with the content item.

2. The computer-implemented method of claim 1, wherein the realization action parameter associates the transaction with a transmission of the content item to the first user computing device.

3. The computer-implemented method of claim 2, wherein the realization action parameter further associates the transaction with the rendering of the content item on the first user computing device.

4. The computer-implemented method of claim 1, wherein the content item comprises an offer, and wherein the transaction data indicates a redemption of the offer.

5. The computer-implemented method of claim 1, wherein the merchant computing device comprises a near field communication ("NFC") computing device.

6. The computer-implemented method of claim 1, wherein determining the correlation between the received transaction data, the first data record, the second data record, and a user account comprises determining a correlation between a computing device identifier and a content item identifier in the transaction data and the second user computing device identifier and the content item identifier in the second data record.

7. The computer-implemented method of claim 1, further comprising, by the data processing computing system:
    identifying an online service account associated with the first user computing device identifier associated with the first user computing device;
    correlating the first user computing device identifier in the first data record indicative of the rendering of the content item to the online service account;
    determining an association between the online service account and the second user computing device identifier;
    providing the content item to the second user computing device; and
    correlating the first data record with the second user computing device identifier based on the association between the second user computing device identifier and the online service account to generate the second data record.

8. The computer-implemented method of claim 7, wherein the online service account comprises an electronic payment account.

9. The computer-implemented method of claim 1, further comprising, by the data processing computing system:
    determining an association between the first user computing device and the second user computing device; and
    correlating the first user computing device identifier and the content item identifier based on the association between the first user computing device and the second user computing device.

10. The computer-implemented method of claim 1, further comprising, by the data processing computing system, receiving, from the second user computing device, an indication of a redemption of an offer associated with the content item by the second user computing device with the merchant computing device, wherein updating the realization action parameter is based on receiving the indication of the redemption of the offer.

11. The computer-implemented method of claim 1, wherein the transaction data is indicative of a transaction between the second user computing device and the merchant computing device.

12. The computer-implemented method of claim 1, wherein the realization action parameter indicates a conversion of the content item.

13. The computer-implemented method of claim 1, wherein the realization action parameter indicates a total number of conversions of the content item.

14. A computer program product to associate realization actions with displayed content, comprising:
- a non-transitory computer readable storage medium having computer-readable program instructions embodied thereon that, when executed by one or more processors, cause the one or more processors to:
- generate a first data record indicative of a rendering of a content item by a first user computing device associated with a user, wherein the first data record comprises a content item identifier and a first user computing device identifier, the first data record being stored at the data processing computing system;
- receive from the first user computing device, instructions to provide the content item to a second user computing device;
- in response to receiving the instructions:
  - transmit the content item to the second user computing device from a data processing computing system; and
  - generate a second data record indicative of transmission of the content item to a second user computing device associated with the user, wherein the second data record comprises a second user computing device identifier and the first data record, the second data record being stored at the data processing computing system;
- receive, from a merchant computing device, transaction data comprising information identifying the content item and information identifying the second user computing device; and
- update, in response to determining a correlation between the received transaction data, the first data record, the second data record, and a user account, a realization action parameter associated with the content item.

15. A system to associate realization actions with displayed online content, comprising:
- a storage device; and
- a processor communicatively coupled to the storage device, wherein the processor executes application code instructions that are stored in the storage device to cause the system to:
  - generate a first data record indicative of a rendering of a content item by a first user computing device associated with a user, wherein the first data record comprises a content item identifier and a first user computing device identifier, the first data record being stored at the data processing computing system;
  - receive from the first user computing device, instructions to provide the content item to a second user computing device;
  - in response to receiving the instructions:
    - transmit the content item to the second user computing device from the system; and
    - generate a second data record indicative of transmission of the content item to a second user computing device associated with the user, wherein the second data record comprises a second user computing device identifier and the first data record, the second data record being stored at the data processing computing system;
  - receive, from a merchant computing device, transaction data comprising information identifying the content item and information identifying the second user computing device; and
  - update, in response to determining a correlation between the received transaction data, the first data record, the second data record, and a user account, a realization action parameter associated with the content item.

* * * * *